US009022563B2

(12) United States Patent
Gupta et al.

(10) Patent No.: US 9,022,563 B2
(45) Date of Patent: May 5, 2015

(54) OPHTHALMIC LENSES WITH ASPHERIC OPTICAL FEATURES

(75) Inventors: Amitava Gupta, Roanoke, VA (US); Ronald D. Blum, Roanoke, VA (US)

(73) Assignee: Mitsui Chemicals, Inc., Tokyo (JP)

( * ) Notice: Subject to any disclaimer, the term of this patent is extended or adjusted under 35 U.S.C. 154(b) by 77 days.

(21) Appl. No.: 12/702,791

(22) Filed: Feb. 9, 2010

(65) Prior Publication Data

US 2010/0201941 A1 Aug. 12, 2010

Related U.S. Application Data

(60) Provisional application No. 61/152,129, filed on Feb. 12, 2009, provisional application No. 61/153,899, filed on Feb. 19, 2009, provisional application No. 61/164,634, filed on Mar. 30, 2009, provisional application No. 61/168,575, filed on Apr. 11, 2009, provisional application No. 61/187,860, filed on Jun. 17, 2009, provisional application No. 61/242,412, filed on Sep. 15, 2009, provisional application No. 61/293,371, filed on Jan. 8, 2010.

(51) Int. Cl.
*G02C 7/06* (2006.01)

(52) U.S. Cl.
CPC ............... *G02C 7/061* (2013.01); *G02C 7/063* (2013.01); *G02C 7/068* (2013.01); *G02C 2202/16* (2013.01)

(58) Field of Classification Search
CPC ............................................. G02C 7/06–7/068
USPC ................. 351/159, 168–169, 171–172, 176, 351/159.42
See application file for complete search history.

(56) References Cited

U.S. PATENT DOCUMENTS

| 5,406,341 A | 4/1995 | Blum |
| 5,598,234 A | 1/1997 | Blum |
| 5,715,032 A * | 2/1998 | Isenberg ............... 351/159.42 |
| 6,000,798 A | 12/1999 | Chipman et al. |
| 6,019,470 A | 2/2000 | Mukaiyama et al. |
| 6,086,203 A | 7/2000 | Blum et al. |

(Continued)

OTHER PUBLICATIONS

Meister, Darryl. N. p., Sep. 2006. Web. Sep. 20, 2013. <http://www.opticampus.com/files/fundamentals_of_progressive_lenses.pdf>.*

(Continued)

*Primary Examiner* — Zachary Wilkes
(74) *Attorney, Agent, or Firm* — Sterne, Kessler, Goldstein & Fox P.L.L.C.

(57) ABSTRACT

Aspects of the present invention provide a lens comprising a non-rotationally symmetric aspheric optical element, surface or feature and a rotationally symmetric aspheric optical element, surface or feature. The non-rotationally symmetric aspheric optical feature can be a progressive power region. The non-rotationally symmetric aspheric optical feature and rotationally symmetric aspheric optical feature can be in optical communication when located on different surfaces of a lens or can be collapsed to occupy a single surface of a lens. The non-rotationally symmetric aspheric optical feature and rotationally symmetric aspheric optical feature can each contribute to the add power of a lens. Distortion (e.g., astigmatism) of a lens of the present invention can be reduced (e.g., globally and/or locally) by optically combing the non-rotationally symmetric aspheric optical feature with the rotationally symmetric aspheric optical feature. Accordingly, the effective or useable vision zones of a lens of the present invention can be increased.

17 Claims, 8 Drawing Sheets

(56) References Cited

U.S. PATENT DOCUMENTS

| | | | |
|---|---|---|---|
| 6,089,713 | A | 7/2000 | Hof et al. |
| 6,106,118 | A | 8/2000 | Menezes et al. |
| 6,139,148 | A | 10/2000 | Menezes |
| 6,183,084 | B1 | 2/2001 | Chipman et al. |
| 6,199,984 | B1 | 3/2001 | Menezes |
| 6,229,595 | B1 | 5/2001 | McKinley |
| 6,390,623 | B1 | 5/2002 | Kokonaski et al. |
| 6,709,105 | B2 | 3/2004 | Menezes |
| 6,883,916 | B2 | 4/2005 | Menezes |
| 6,886,938 | B1 | 5/2005 | Menezes |
| 7,008,058 | B2 | 3/2006 | Haimerl et al. |
| 7,125,118 | B2 * | 10/2006 | Kaga ..................... 351/159.42 |
| 7,377,638 | B2 | 5/2008 | Gupta et al. |
| 8,292,953 | B2 * | 10/2012 | Weeber et al. ................ 623/6.3 |
| 2005/0094096 | A1 | 5/2005 | Menezes |
| 2006/0066808 | A1 * | 3/2006 | Blum et al. .................... 351/159 |

OTHER PUBLICATIONS

Meister, Darryl, and James Sheedy. Introduction to Ophthalmic Optics. San Diego: Carl Zeiss Vision, 2008. pp. 30, 80, 83-85.*

International Search Report corresponding to the PCT/US2010/023710 application.

* cited by examiner

OPHTHALMIC LENSES WITH ASPHERIC OPTICAL FEATURES

CROSS-REFERENCE TO RELATED APPLICATIONS

This application claims priority from and incorporates by reference in their entirety the following provisional applications:
U.S. Appl. No. 61/152,129, filed on Feb. 12, 2009;
U.S. Appl. No. 61/153,899, filed on Feb. 19, 2009;
U.S. Appl. No. 61/164,634, filed on Mar. 30, 2009;
U.S. Appl. No. 61/168,575, filed on Apr. 11, 2009;
U.S. Appl. No. 61/187,860, filed on Jun. 17, 2009;
U.S. Appl. No. 61/242,412, filed on Sep. 15, 2009; and
U.S. Appl. No. 61/293,371, filed on Jan. 8, 2010.

BACKGROUND OF THE INVENTION

1. Field of the Invention

The present invention generally relates to ophthalmic lenses. More specifically, the present invention provides improved single vision lenses and multifocal lenses having enhanced vision zones.

2. Background Art

Conventional multifocal ophthalmic lenses (e.g., progressive lenses) provide a user with two or more vision zones. These conventional lenses, however, generally include large amounts of distortion (e.g., astigmatism) that can cause numerous vision compromises for the user. As a result, the benefits of the vision zones provided by such conventional lenses are reduced. Accordingly, what is needed is an ophthalmic lens design that limits or reduces the amount of introduced distortion (e.g., astigmatism) to provide vision zones that are improved over those provided by conventional lenses.

DETAILED DESCRIPTION OF THE INVENTION

Aspects of the present invention provide a multifocal ophthalmic lens comprising a non-rotationally symmetric aspheric optical element, surface or feature and a rotationally symmetric aspheric optical element, surface or feature. The non-rotationally symmetric aspheric optical feature can be, for example, a progressive optical power region. The non-rotationally symmetric aspheric optical feature and the rotationally symmetric aspheric optical feature can be positioned to be in optical communication while being located on different surfaces of an ophthalmic lens. The non-rotationally symmetric aspheric optical feature and the rotationally symmetric aspheric optical feature can also be collapsed to form a single surface of an ophthalmic lens. The non-rotationally symmetric aspheric optical feature and the rotationally symmetric aspheric optical feature can each contribute to the total add power of an ophthalmic lens. The distortion (e.g., astigmatism) of an ophthalmic lens of the present invention can be reduced or minimized (e.g., globally and/or locally) by optically combing the non-rotationally symmetric aspheric optical feature with the rotationally symmetric aspheric optical feature. Accordingly, the effective or useable vision zones of an ophthalmic lens of the present invention can be increased or enhanced.

Figure 1:
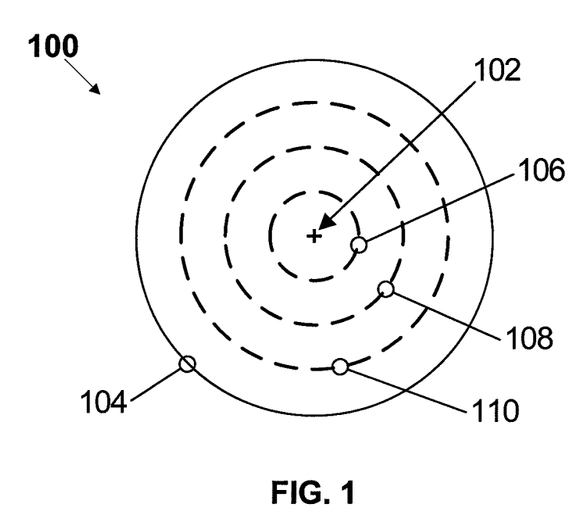
FIG. 1 illustrates a lens surface comprising a rotationally symmetric aspheric surface in accordance with an aspect of the present invention.
Figure 2:
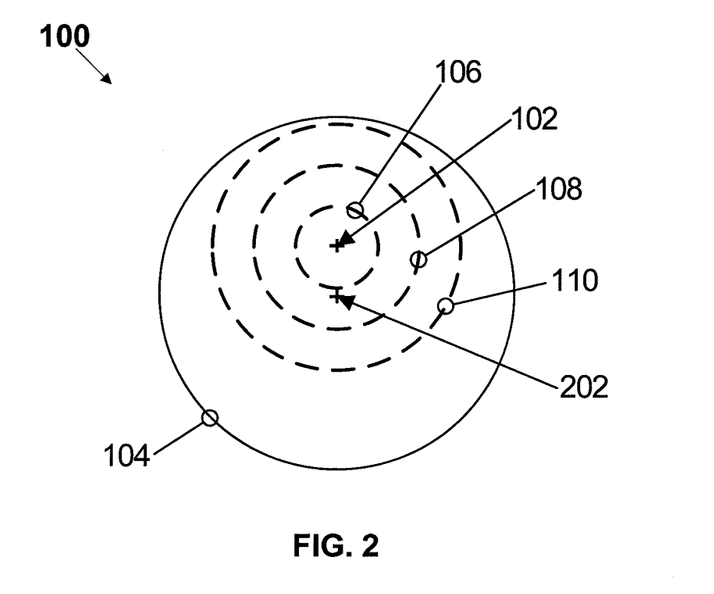
FIG. 2 illustrates a first exemplary positioning of the rotationally symmetric aspheric surface depicted in FIG. 1.

FIG. 1 illustrates a lens surface comprising a rotationally symmetric aspheric surface 100 in accordance with an aspect of the present invention. The rotationally symmetric aspheric surface 100 is shown as having a center 102. The center 102 can coincide with a geometric center of the lens surface but is not so limited. That is, the center 102 of the rotationally symmetric aspheric surface 100 can be positioned anywhere on the lens surface. For example, the rotationally symmetric aspheric surface 100 can coincide or be centered about the fitting point of a lens or lens surface. FIG. 2 illustrates a lens surface having a geometric center 202 and further comprising the rotationally symmetric aspheric surface 100 having a center 102 that coincides with a fitting point of the lens surface.

As shown in FIG. 1, the rotationally symmetric aspheric surface 100 can have an edge or boundary 104. The boundary 104 (or a portion thereof) can coincide with an edge or boundary of the lens surface but is not so limited. That is, the boundary 104 of the rotationally symmetric aspheric surface 100 can be positioned anywhere on the lens surface. Overall, the rotationally symmetric aspheric surface 100 can be of any size and can occupy the entire lens surface or less than the entire lens surface (e.g., a portion of a lens surface).

The rotationally symmetric aspheric surface 100 can be an optical element or feature that provides a progression of optical power that is substantially the same in all radial directions. The rotationally symmetric aspheric surface 100 can provide an increasing or decreasing progression of optical power (or a combination thereof). The optical power profile provided by the rotationally symmetric aspheric surface 100 can be continuous or discontinuous, or a combination thereof. As such, the optical power profile provided by the rotationally symmetric aspheric surface 100 can include an optical power discontinuity.

The rotationally symmetric aspheric surface 100 is shown in FIG. 1 as having a circular shape but is not so limited. That is, while the optical power profile of the rotationally symmetric aspheric surface 100 is symmetrical, the entirety of the rotationally symmetric aspheric surface 100 may not be contained or fully positioned on a lens or lens surface. The rotationally symmetric aspheric surface 100 can be contained or positioned within the boundary of a lens surface or only a portion of the rotationally symmetric aspheric surface 100 can be contained or positioned on the lens surface.

Specifically, less than the entire rotationally symmetric aspheric surface 100 as a circular shape can be contained on the lens surface—for example, the rotationally symmetric aspheric surface 100 as a half-circle can be positioned on the lens surface. This can be accomplished by placing the center 102 of the rotationally symmetric aspheric surface 100 near an edge (e.g., a bottom edge) of the lens surface. In doing so, only a portion (e.g., approximately a half-circle shape of the top portion) of the rotationally symmetric aspheric surface 100 will be positioned on the lens surface and the remaining portion (e.g., approximately a half-circle shape of the bottom portion) will be positioned off the lens surface.

Figure 3:
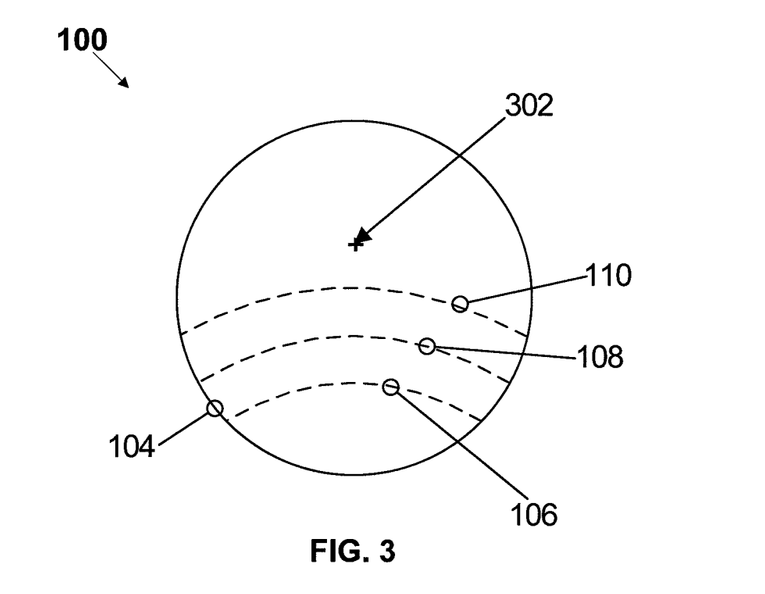
FIG. 3 illustrates a second exemplary positioning of the rotationally symmetric aspheric surface depicted in FIG. 1.

FIG. 3 illustrates a lens surface comprising the rotationally symmetric aspheric surface 100 positioned below a geometric center 302 of the lens surface such that only a portion of the rotationally symmetric aspheric surface 100 is positioned on the lens surface. Overall, any portion of the rotationally symmetric aspheric surface 100 can be positioned on the lens surface in accordance with an aspect of the present invention.

The rotationally symmetric aspheric surface 100 can comprise any number of aspheric curves to form any desired optical profile. Overall, the rotationally symmetric aspheric surface 100 can provide any optical power progression or change between the center 102 and the edge 104 of the rotationally symmetric aspheric surface 100. As a regressive rotationally symmetric aspheric surface 100, an optical power can be provided at the center 102 that is lower than the optical power provided at the boundary 104. As a non-regressive rotationally symmetric aspheric surface 100, the center an optical power can be provided at the center 102 that is higher than the optical power provided at the boundary 104.

As either regressive or non-regressive, the rotationally symmetric aspheric surface 100 can provide increasing and/or decreasing optical power along a portion of the lens between the center 102 and the edge 104. That is, a regressive rotationally symmetric aspheric surface 100 need not provide only a progression of increasing optical power from the center 102 to the edge 104 and can instead provide regions of decreasing optical power. Similarly, a non-regressive rotationally symmetric aspheric surface 100 need not provide only a progression of decreasing optical power from the center 102 to the edge 104 and can instead also provide regions of increasing optical power.

The rotationally symmetric aspheric surface 100 can comprise any number of discontinuities (e.g., at or near the edge 104 or the center 102) or can provide a continuous optical power profile without any discontinuities.

The rotationally symmetric aspheric surface 100 is shown in FIG. 1 as comprising a first symmetric optical power region 106, a second symmetric optical power region 108 and a third symmetric optical power region 110. As described above, the rotationally symmetric aspheric surface 100 can comprise any number of optical power values between the center 102 and the edge 104. As such, the three optical power regions 106, 108 and 110 shown in FIG. 1 are for exemplary illustrative purposes only. The three optical power regions 106, 108 and 110 can provide any optical power and can be of the same or of a different optical power than any other region provided by the rotationally symmetric aspheric surface 100. Each of the symmetrical optical power regions 106, 108 and 110 can provide substantially the same optical powers at each respective radial position of the symmetrical optical power regions 106, 108 and 110.

As an example, the rotationally symmetric aspheric surface 100 as a regressive rotationally symmetric aspheric surface can provide an optical power with the optical power region 110 that is higher than an optical power provided by the optical power region 108 which, in turn, can be higher than an optical power provided by the optical power region 106. As another example, the rotationally symmetric aspheric surface 100 as a non-regressive rotationally symmetric aspheric surface can provide an optical power with the optical power region 110 that is lower than an optical power provided by the optical power region 108 which, in turn, can be lower than an optical power provided by the optical power region 106.

The rotationally symmetric aspheric surface 100 can be formed or positioned on any surface of an ophthalmic lens (e.g., either a composite lens or a monolithic lens) in accordance with an aspect of the present invention. Specifically, the rotationally symmetric aspheric surface 100 can be formed or positioned on an outer surface of an ophthalmic lens or can be positioned on an inner surface or interface of a composite ophthalmic lens. The rotationally symmetric aspheric surface 100 can be formed by mold or by free-form or by any other conventional lens manufacturing techniques.

Additionally, the rotationally symmetric aspheric surface 100 can be positioned to be in optical communication with any other lens surface or lens optic or feature. As an example, the rotationally symmetric aspheric surface 100 can be placed in optical communication with a non-rotationally symmetric aspheric surface (e.g., a progressive optical power region) to form a multifocal lens. As a further example, the rotationally symmetric aspheric surface 100 can be used to form a single vision lens.

Figure 4:
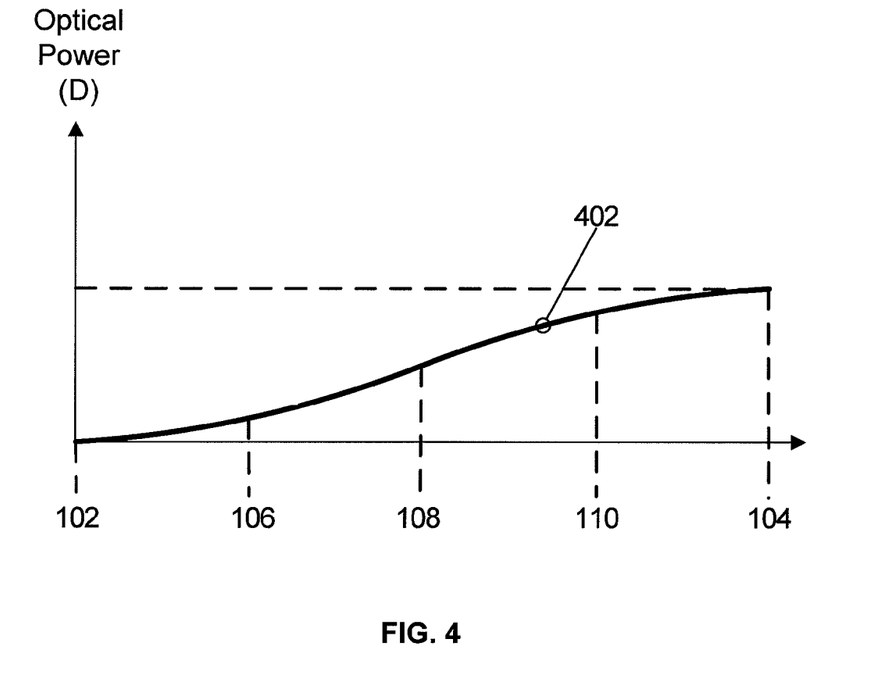
FIG. 4 illustrates an exemplary regressive power profile that can be provided by the rotationally symmetric aspheric surface depicted in FIG. 1.

FIG. 4 illustrates an exemplary regressive power profile 402 that can be provided by the rotationally symmetric aspheric surface 100 in accordance with an aspect of the present invention. The regressive power profile 402 can be provided by the rotationally symmetric aspheric surface 100 as a regressive rotationally symmetric aspheric surface 100. The power profile 402 can be considered regressive because, as described above, the power profile 402 provides an optical power at the center 102 that is lower than an optical power provided at the edge 104.

As shown in FIG. 4, the regressive power profile 402 is continuous and provides a gradual increase in optical power moving from the center 102 to the edge 104. Further, FIG. 4 shows the relative optical powers provided by the optical power regions 106, 108 and 110.

Figure 5:
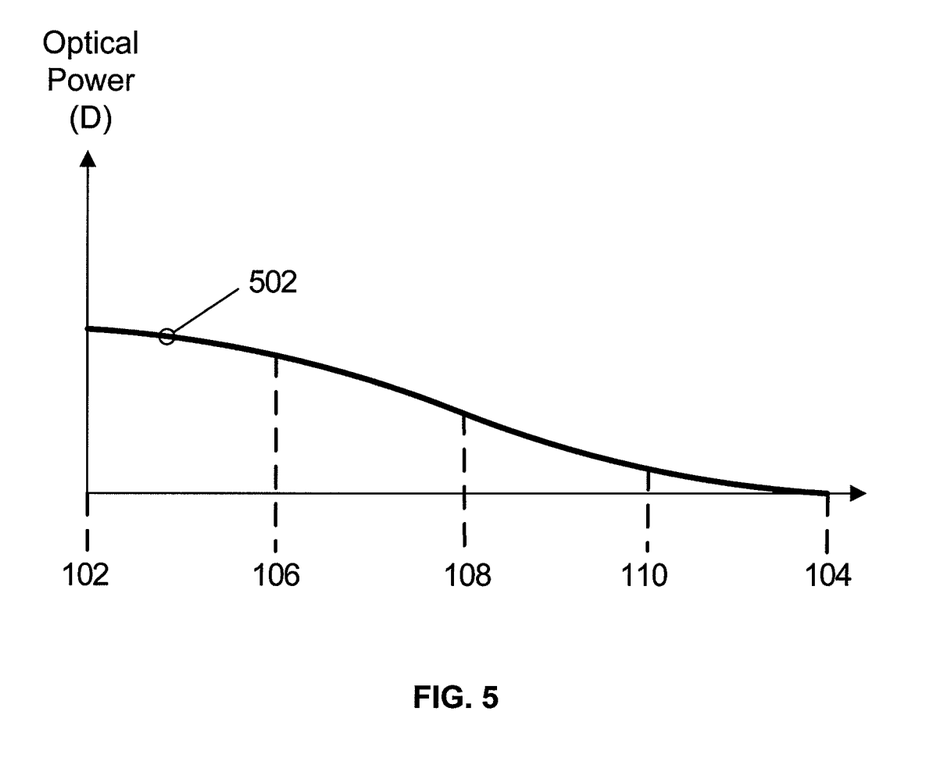
FIG. 5 illustrates an exemplary non-regressive power profile that can be provided by the rotationally symmetric aspheric surface depicted in FIG. 1.

FIG. 5 illustrates an exemplary non-regressive power profile 502 that can be provided by the rotationally symmetric aspheric surface 100 in accordance with an aspect of the present invention. The regressive power profile 502 can be provided by the rotationally symmetric aspheric surface 100 as a non-regressive rotationally symmetric aspheric surface 100. The power profile 502 can be considered non-regressive because, as described above, the power profile 502 provides an optical power at the center 102 that is higher than an optical power provided at the edge 104.

As shown in FIG. 5, the non-regressive power profile 502 is continuous and provides a gradual decrease in optical power moving from the center 102 to the edge 104. Further, FIG. 5 shows the relative optical powers provided by the optical power regions 106, 108 and 110.

Figure 6:
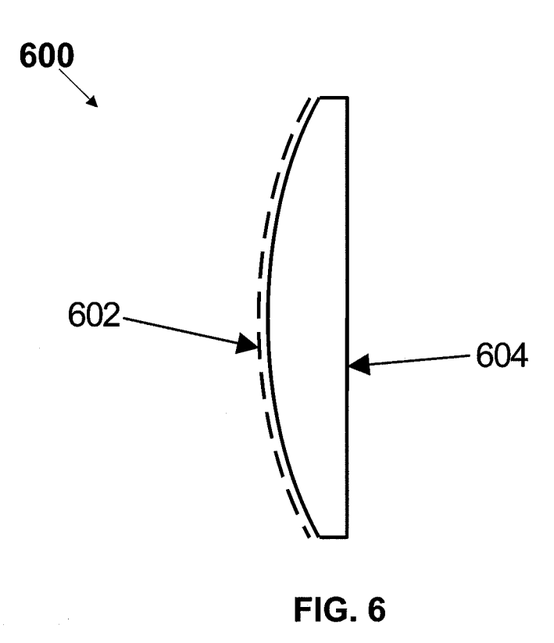
FIG. 6 illustrates a lens comprising a rotationally symmetric aspheric surface in accordance with an aspect of the present invention.

FIG. 6 illustrates a lens 600 comprising a rotationally symmetric aspheric surface 602 in accordance with an aspect of the present invention. The rotationally symmetric aspheric surface 602 can represent the rotationally symmetric aspheric surface 100 described above. The lens 602 can be a semi-finished lens blank. The rotationally symmetric aspheric surface 602 can be positioned on a front external surface of the lens 600. Depending upon the optical power profile provided by the rotationally symmetric aspheric surface 602, the lens 602 can be a single vision lens or can be a multifocal lens.

A back surface 602 of the lens 600 can be modified to transform the lens 600 from a semi-finished lens blank to a finished lens blank. As an example, the back surface 604 can be modified to include a progressive optical power region (e.g., by free-forming). As an alternative to the lens 600 depicted in FIG. 6, the rotationally symmetric aspheric surface 602 can be positioned on the back surface 604 of the lens 600. Under this scenario, the front surface of the lens 600 can contain a progressive optical power region or other optical elements.

Figure 7:
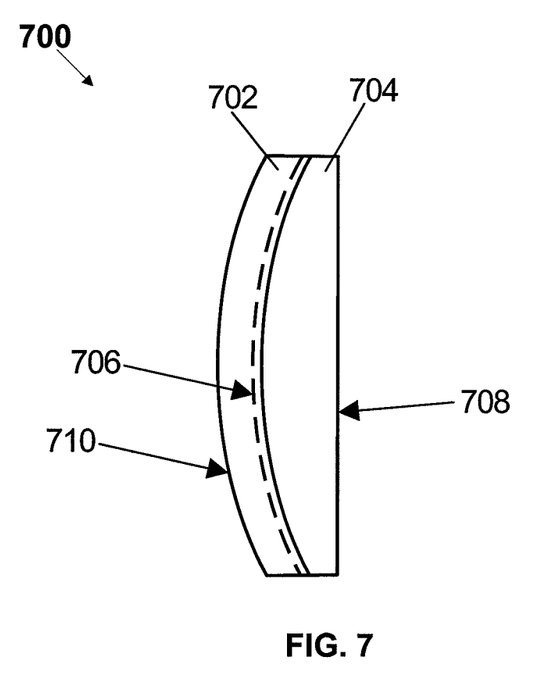
FIG. 7 illustrates a composite lens comprising a first layer and a second layer in accordance with an aspect of the present invention.

FIG. 7 illustrates a composite lens 700 comprising a first layer 702 and a second layer 704 in accordance with an aspect of the present invention. The first layer 702 and the second layers 704 can comprise different materials having different indices of refraction. The composite lens 700 is illustrated as a semi-finished lens blank.

The composite lens 700 can comprise a buried rotationally symmetric aspheric surface 706. The rotationally symmetric aspheric surface 706 can represent the rotationally symmetric aspheric surface 100 described above. The rotationally symmetric aspheric surface 706 can be considered to be buried because it can be positioned at an interface between the first and second layers 702 and 704. As an example, the rotationally symmetric aspheric surface 706 can be positioned on an internal surface of the second layer 704 that is positioned adjacent to an internal surface of the first layer 702. Depending upon the optical power profile provided by the rotationally symmetric aspheric surface 706, the lens 700 can be a single vision lens or can be a multifocal lens.

A back surface 708 of the lens 700 can be modified to transform the lens 700 from a semi-finished lens blank to a finished lens blank. As an example, the back surface 708 can be modified to include a progressive optical power region (e.g., by free-forming). A front surface 710 of the lens 700 is shown as not comprising a progressive optical power region or a rotationally symmetric aspheric surface but is not so limited. As an example, the front surface 710 can comprise a progressive optical power region.

Figure 8:
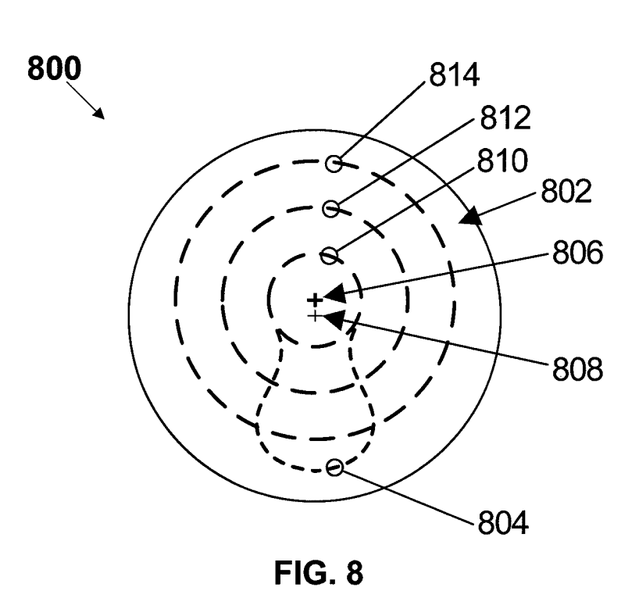
FIG. 8 illustrates a lens comprising a rotationally symmetric aspheric surface and a progressive optical power region in accordance with an aspect of the present invention.

FIG. 8 illustrates a lens 800 comprising a rotationally symmetric aspheric surface (or optical feature or element) 802 and a progressive optical power region 804. The rotationally symmetric aspheric surface 802 can represent the rotationally symmetric aspheric surface 100 described above. As shown in FIG. 8, at least a portion of the rotationally symmetric aspheric surface 802 is in optical communication with at least a portion of the progressive optical power region 804.

The lens 800 can be a monolithic lens or a composite lens. Accordingly, the rotationally symmetric aspheric surface 802 can be positioned on any surface of the lens 800. For example, the rotationally symmetric aspheric surface 802 can be positioned on an external surface of the lens 800 or on an internal surface of the lens 800. Likewise, the progressive optical power region 804 can be positioned on any surface of the lens 800 including, for example, an external surface of the lens 800 or an internal surface of the lens 800.

As shown in FIG. 8, the lens 800 can have a fitting point 806 and a geometric center 808. The rotationally symmetric aspheric surface 802 can be positioned anywhere on a surface of the lens 800 and is not limited to being centered about the fitting point 806 (as depicted in FIG. 8) or the geometric center 808. Similarly, the progressive optical power region 804 can be positioned anywhere on a surface of the lens 800 and is not limited to being positioned just below the geometric center 808 (as depicted in FIG. 8) or the fitting point 806.

The rotationally symmetric aspheric surface 802 can comprise a first symmetric optical power region 810, a second symmetric optical power region 812, and a third symmetric optical power region 814. Each of the symmetrical optical power regions 810, 812, and 814 can provide substantially the same optical powers at each respective radial position of the symmetrical optical power regions 810, 812, and 814 (similar to the optical power regions 106, 108 and 110 depicted in FIG. 1). The rotationally symmetric aspheric surface 802 can be either a regressive or a non-regressive symmetric aspheric optical element or feature or surface.

By placing the rotationally symmetric aspheric surface 802 in optical communication with the progressive optical power region 804, the optical power provided by the rotationally symmetric aspheric surface 802 can be additive to the optical power provided by the progressive optical power region 804 for the portions of the lens 800 where the rotationally symmetric aspheric surface 802 optically overlaps the progressive optical power region 804. In particular, an add power provided by the progressive optical power region 804 can be increased by an optical power provided by the rotationally symmetric aspheric surface 802 that overlaps the near vision area of the progressive optical power region 804.

As an example, the optical power provided by the third symmetric optical power region 814, which can be positive, negative or neutral, can be additive to the add power provided by the progressive optical power region 804. In this way, the progressive optical power region 804 can provide a first portion of a total add power of the lens 800 and the rotationally symmetric aspheric surface 802 can provide a second portion of the total add power of the lens 800.

If no other optical element or feature of the lens 800 contributes to the total add power of the lens 800, then the first portion provided by the progressive optical power region 804 and the second portion provided by the rotationally symmetric aspheric surface 802 can combine to form the total add power of the lens 800. If another optical element or feature (e.g., a second progressive optical power region or a second rotationally symmetric aspheric surface) of the lens 800 contributes to the total add power of the lens 800, then the first portion provided by the progressive optical power region 804 and the second portion provided by the rotationally symmetric aspheric surface 802 can combine to form a portion of the total add power of the lens 800.

Overall, the lens 800 can include additional optical features or elements (i.e., one or more additional rotationally symmetric aspheric regions and/or one or more additional non-rotationally symmetric aspheric regions) that can be placed in optical communication with the rotationally symmetric aspheric surface 802 and the progressive optical power region 804 to contribute to the total add power of the lens 800. Further, additional vision zones of a progressive optical power region—e.g., an intermediate vision zone or a far-intermediate vision zone—can be enhanced by placing a progressive optical power region in optical communication with a rotationally symmetric aspheric optical element of the present invention.

Placing the rotationally symmetric aspheric surface 802 in optical communication with the progressive optical power region 804 such that add powers contributed by each component are additive can reduce the overall distortion of the lens 800. Specifically, by supplementing the add power provided by the progressive optical power region 804, the total add power of the progressive optical power region 804 can be reduced or lowered compared to a progressive optical power region that provides all the add power of a lens. In turn, the distortion (e.g., astigmatism) introduced by the progressive optical power region 804 can be reduced. Reducing the distortion introduced by the progressive optical power region 804 can increase the vision zones (e.g., the near vision zone) provided by the lens 800 when compared to a lens having the same add power that is contributed entirely by a progressive optical power region.

Distortion (e.g., astigmatism) can be associated with the rotationally symmetric aspheric surface 802. Distortion (e.g., astigmatism) can also be separately associated with the progressive optical power region 804. The distortion introduced by each of these optical features or elements, however, need not be additive. Instead, the astigmatism (e.g., in the form or represented by astigmatic vectors) introduced by the rotationally symmetric aspheric surface 802 can be formed and positioned in a manner to cancel astigmatism (e.g., in the form or represented by astigmatic vectors) introduced by the progressive optical power region 804.

Specifically, an orientation of the astigmatic vectors of the rotationally symmetric aspheric power region 802 can cancel out or reduce a portion of the astigmatism vectors of the progressive optical power region 804. This can enable the combined distortion or astigmatism of the lens 800 (i.e., the total distortion or astigmatism globally and/or locally) to be less than the sum of the individual astigmatism components associated with the rotationally symmetric aspheric power region 802 and the progressive optical power region 804. As a result, the vision zones of the lens 800 can be increased or enhanced.

As an alternative to positioning the rotationally symmetric aspheric surface 802 and the progressive optical power region 804 (or non-rotationally symmetric aspheric surface) on separate surfaces of the lens 800, the optical features of both the rotationally symmetric aspheric surface 802 and the progressive optical power region 804 can be collapsed to form a single surface or combined optical feature or element. This collapsed surface element can be positioned on any surface of the lens 800 including internal and external surfaces. The collapsed surface can comprise a superposition of the optical features and characteristics of the individual rotationally symmetric aspheric surface 802 and non-rotationally symmetric aspheric surface (e.g., a progressive optical power region).

Aspheric optical elements of the present invention can also include other shapes or geometries—other than rotationally symmetric geometries—to provide the benefits of multifocal lenses described above. For example, ellipsoidal and triangular shaped geometries comprising aspheric surface or features can be used to cancel or mitigate astigmatism introduced by a progressive optical power region. In general, the present invention contemplates the use of aspheric surfaces or elements having two or more axes of symmetry (e.g., where one axes is longer than the other).

According to an aspect of the present invention, one or more dynamic optics can be placed in optical communication with a rotationally symmetric aspheric surface of the present invention. A dynamic optic or lens can be an optic or lens that is capable of altering focus dynamically as opposed to statically. A dynamic optic or lens can adjust focus after the lens has been finished to a proper optical prescription. By way of example, a dynamic optic or lens can be a gas optic or lens, a fluid optic or lens, a membrane optic or lens, a mechanically driven optic or lens, or an electro-active optic or lens. A dynamic optic or lens can be placed in optical communication with any of the exemplary lenses described above to contribute a further component of a total add power of the resultant lens (e.g., the lens depicted in FIGS. 1, 6, 7 and 8). The dynamic optic or lens, for example, can be placed or buried within the lens.

According to an aspect of the present invention, one or more refractive gradient surfaces can be placed in optical communication with a rotationally symmetric aspheric surface of the present invention. The refractive gradient surfaces can be a surface having a variable or changing refractive index across its surface. A refractive gradient surface can be placed in optical communication with any of the exemplary lenses described above to contribute a further component of a total add power of the resultant lens (e.g., the lens depicted in FIGS. 1, 6, 7 and 8).

Conclusion

While various embodiments of the present invention have been described above, it should be understood that they have been presented by way of example and not limitation. The optical features and elements of the present invention (e.g., rotationally symmetric aspheric regions, non-rotationally symmetric aspheric regions, dynamic lens and optics, refractive gradient surfaces or regions) can be combined with any other conventional optical feature or element. The optical features and elements of the present invention can be positioned on any surface of a lens (including interior or buried surfaces) and can contribute to the optical power of any vision zone of a multifocal lens. Lenses of the present invention can be semi-finished lens blanks, finished lenses and unfinished lens blanks. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A lens, comprising:
a rotationally symmetric aspheric region providing a first portion of a total add power of the lens;
a non-rotationally symmetric aspheric region providing a second portion of a total add power of the lens;
wherein a portion of the rotationally symmetric aspheric region is in optical communication with a portion of the non-rotationally symmetric aspheric region such that the first portion of the total add power and the second portion of the total add power are combined to contribute to the total add power of the lens;
wherein the rotationally symmetric aspheric region and the non-rotationally symmetric aspheric region are collapsed to form a single region on a surface of the lens; and
wherein the rotationally symmetric aspheric region provides a progression of optical power that is substantially the same in all radial directions about an axis of rotation that is substantially perpendicular to the surface of the lens.

2. The lens of claim 1, wherein the first portion of the total add power and the second portion of the total add power are combined to provide the entirety of the total add power of the lens.

3. The lens of claim 1, further comprising an additional optical element providing a third portion of the total add power of the lens, wherein the first, second and third portions are combined to provide the entirety of the total add power of the lens.

4. The lens of claim 1, wherein the non-rotationally symmetric aspheric region is a progressive optical power region.

5. The lens of claim 4, further comprising a second non-rotationally symmetric aspheric region providing a third portion of a total add power of the lens, wherein the second non-rotationally symmetric aspheric region is in optical communication with the portion of the rotationally symmetric aspheric region and the portion of the non-rotationally symmetric aspheric region to contribute to the total add power of the lens.

6. The lens of claim 1, wherein the rotationally symmetric aspheric region is centered about a fitting point of the lens.

7. The lens of claim 1, wherein the rotationally symmetric aspheric region is centered about a geometric center point of the lens.

8. The lens of claim 1, wherein the rotationally symmetric aspheric region is a regressive rotationally symmetric aspheric region providing a regressive optical power profile.

9. The lens of claim 1, wherein the rotationally symmetric aspheric region is a non-regressive rotationally symmetric aspheric region providing a non-regressive optical power profile.

10. The lens of claim 1, wherein the lens is a monolithic lens.

11. The lens of claim 1, wherein the lens is a composite lens.

12. The lens of claim 1, wherein the rotationally symmetric aspheric region is positioned on an external surface of the lens.

13. The lens of claim 1, wherein the rotationally symmetric aspheric region is positioned on an internal surface of the lens.

14. The lens of claim 1, wherein the rotationally symmetric aspheric region provides a continuous optical power profile.

15. The lens of claim 1, wherein the rotationally symmetric aspheric region comprises a discontinuity and provides an optical power profile comprising at least one optical power discontinuity.

16. The lens of claim 1, further comprising a second rotationally symmetric aspheric region providing a third portion of a total add power of the lens.

17. The lens of claim 16, wherein the second rotationally symmetric aspheric is collapsed to form the single region on the surface of the lens.

* * * * *